(12) United States Patent
Hanayama

(10) Patent No.: US 9,930,267 B2
(45) Date of Patent: Mar. 27, 2018

(54) IMAGE PICKUP APPARATUS THAT AUTOMATICALLY GENERATES TIME-LAPSE MOVING IMAGE, MOVING IMAGE GENERATION METHOD, AND STORAGE MEDIUM

(71) Applicant: CANON KABUSHIKI KAISHA, Tokyo (JP)

(72) Inventor: Tatsuya Hanayama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/233,379

(22) Filed: Aug. 10, 2016

(65) Prior Publication Data
US 2017/0054936 A1    Feb. 23, 2017

(30) Foreign Application Priority Data
Aug. 20, 2015  (JP) .................. 2015-162687

(51) Int. Cl.
| | | |
|---|---|---|
| *H04N 5/92* | (2006.01) | |
| *H04N 5/78* | (2006.01) | |
| *H04N 5/235* | (2006.01) | |
| *H04N 5/77* | (2006.01) | |
| *H04N 5/783* | (2006.01) | |
| *H04N 5/907* | (2006.01) | |
| *H04N 5/232* | (2006.01) | |
| *H04N 9/73* | (2006.01) | |

(52) U.S. Cl.
CPC ........... *H04N 5/2356* (2013.01); *H04N 5/772* (2013.01); *H04N 5/783* (2013.01); *H04N 5/907* (2013.01); *H04N 5/23293* (2013.01); *H04N 9/735* (2013.01)

(58) Field of Classification Search
CPC ........ H04N 5/915; H04N 5/2356; H04N 5/77; H04N 5/23293
USPC ................ 386/226, 224, 225, 227, 278, 281
See application file for complete search history.

(56) References Cited

U.S. PATENT DOCUMENTS 7,450,162 B2 * 11/2008 Shioji .................... H04N 5/772
348/231.2

FOREIGN PATENT DOCUMENTS

JP          11-212139 A        8/1999

* cited by examiner

*Primary Examiner* — Robert Chevalier
(74) *Attorney, Agent, or Firm* — Cowan, Liebowitz & Latman, P.C.

(57) ABSTRACT

An image pickup apparatus that enables automatic generation of a time-lapse moving image for each photographing condition of an automatic bracket photographing function set in combination with a time-lapse photographing function. The image pickup apparatus acquires a plurality of photographed images by repeatedly performing photographing according to a plurality of photographing conditions set in advance, at time interval set in advance, and generates a plurality of time-lapse moving images by composing the plurality of acquired photographed images for each of the plurality of photographing conditions.

14 Claims, 6 Drawing Sheets

IMAGE PICKUP APPARATUS THAT AUTOMATICALLY GENERATES TIME-LAPSE MOVING IMAGE, MOVING IMAGE GENERATION METHOD, AND STORAGE MEDIUM

BACKGROUND OF THE INVENTION

Field of the Invention

The present invention relates to an image pickup apparatus that automatically generates a time-lapse moving image, a moving image generation method, and a storage medium.

Description of the Related Art

An example of image pickup apparatuses such as a digital camera is provided with a time-lapse photographing function, a time-lapse moving image generation function, an automatic bracket photographing function (specifically, an automatic exposure (AE) bracket photographing function or an automatic focus (AF) bracket photographing function) and the like. The time-lapse photographing function is a function to perform photographing a predetermined number of times every predetermined set time. The time-lapse moving image generation function is a function to generate a moving image from photographed images which have been sequentially acquired using the time-lapse photographing function. The AE bracket photographing function is a function to acquire a plurality of photographed images by performing photographing under a plurality of exposure conditions in photographing of a single frame. The AF bracket photographing function is a function to acquire a plurality of photographed images having different focus positions in photographing of a single frame.

In general, these functions are arbitrarily set according to a subject or a photographing condition by a user of the image pickup apparatus, and for example, a setting is assumed in which a plurality of frame images are requested to be acquired in combination with the AE bracket photographing function at the time of photographing of a single frame using the time-lapse photographing. With respect to such a request, a technique is proposed in which photographing of a single frame in which multiple exposure photographing with a predetermined exposure time is performed arbitrary number of times is repeatedly performed for a predetermined number of times with a predetermined time interval (see Japanese Laid-Open Patent Publication (Kokai) No. H11-212139).

According to the technique disclosed in Japanese Laid-Open Patent Publication (Kokai) No. H11-212139, for example, it is possible to acquire a plurality of photographed images with a plurality of differences in exposure level using an AE bracket photographing function in every photographing of a single frame in photographing of a plurality of frames. However, when the photographed images are used as a frame image in the photographed order in the case of generating a time-lapse moving image from the photographed images acquired as mentioned above, a moving image in which a change in brightness and darkness are repeated is formed. In order to avoid this problem, the user needs to sort the photographed images for each difference in exposure level, which makes the operation troublesome.

SUMMARY OF THE INVENTION

The invention provides an image pickup apparatus that enables automatic generation of a time-lapse moving image for each photographing condition of an automatic bracket photographing function set in combination with a time-lapse photographing function, a moving image reproduction method, and a storage medium.

Accordingly, a first aspect of the present invention provides an image pickup apparatus comprising an image pickup unit configured to form an optical image of a subject on an image pickup device to acquire a photographed image, a time-lapse photographing unit configured to perform photographing using the image pickup unit at a time interval set in advance, an automatic bracket photographing unit configured to sequentially perform photographing, using the image pickup unit, under a plurality of photographing conditions set in advance, in photographing of a single frame, a moving image generation unit configured to generate a moving image from a plurality of photographed images, and a control unit configured to control the time-lapse photographing unit, the automatic bracket photographing unit, and the moving image generation unit, wherein the control unit acquires the plurality of photographed images by repeatedly performing photographing according to the plurality of photographing conditions at the time interval, and generates a plurality of moving images by composing the plurality of acquired photographed images for each of the plurality of photographing conditions.

Accordingly, a second aspect of the present invention provides an image pickup apparatus comprising an image pickup unit configured to form an optical image of a subject on an image pickup device to acquire a photographed image, a time-lapse photographing unit configured to perform photographing using the image pickup unit at a time interval set in advance, an image processing unit configured to perform predetermined image processing on the photographed image acquired by the time-lapse photographing unit, a moving image generation unit configured to generate a moving image from a plurality of images generated by the image processing unit, and a control unit configured to control the image pickup unit, the time-lapse photographing unit, the image processing unit, and the moving image generation unit, wherein the control unit generates a plurality of types of images by applying a plurality of different image processing conditions on each of the plurality of photographed images, and generates a plurality of different moving images by composing the plurality of types of generated images for each of the plurality of different image processing conditions.

According to the invention, it is possible to automatically generate a time-lapse moving image for each photographing condition of an automatic bracket photographing function set in combination with a time-lapse photographing function.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Herein, a digital camera is exemplified as an image pickup apparatus according to the invention.

Figure 1:
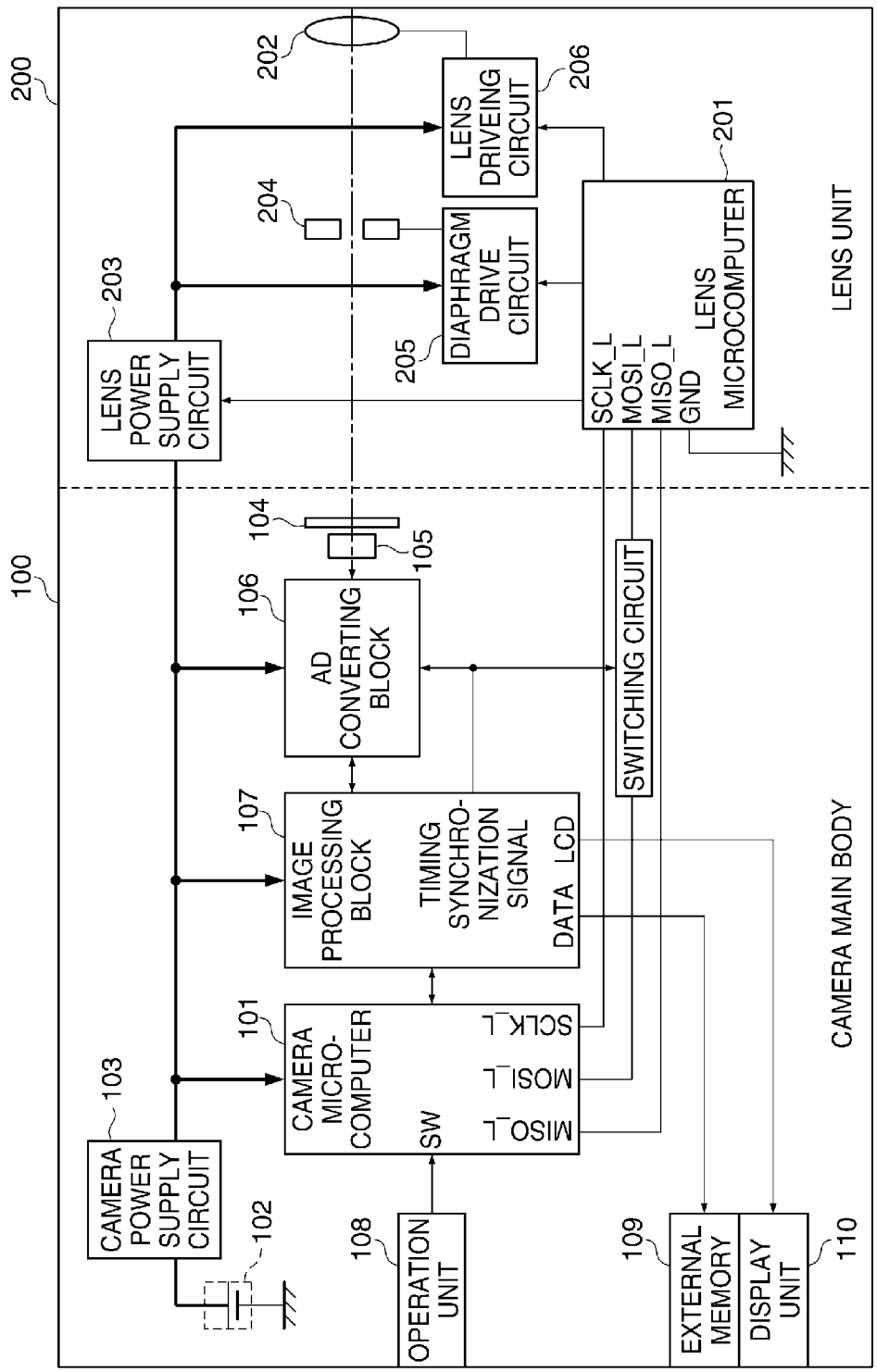
FIG. 1 is a block diagram showing a schematic configuration of a digital camera which is an example of an image pickup apparatus according to an embodiment of the invention.

FIG. 1 is a block diagram showing a schematic configuration of a digital camera according to an embodiment of the invention. The digital camera includes a camera main body 100 and a lens unit 200. The lens unit 200 may be configured to be attachable and detachable with respect to the camera main body 100 such as an interchangeable lens of a single-lens reflex camera, or may be configured to be integrated with the camera main body 100 so as not to be detachable such as a collapsible lens barrel of a compact camera.

The camera main body 100 is provided with a camera microcomputer 101, a battery 102, a camera power supply circuit 103, a shutter 104, an image pickup device 105, an AD converting block 106, an image processing block 107, an operation unit 108, an external memory 109, and a display unit 110. In addition, the lens unit 200 is provided with a lens microcomputer 201, a photographing lens 202, a lens power supply circuit 203, a diaphragm 204, a diaphragm drive circuit 205, and a lens driving circuit 206.

The camera microcomputer 101 includes a CPU, a ROM, a RAM, and the like, and controls each unit of the camera main body 100 by causing a program or a parameter stored in the ROM to be developed in a work area of the RAM. In addition, the camera microcomputer 101 performs communication with the lens microcomputer 201 to control the drive of the lens unit 200 via the lens microcomputer 201. Incidentally, the camera microcomputer 101 determines a mounting state of the lens unit 200 with respect to the camera main body 100 through the communication with the lens microcomputer 201, and further, acquires configuration information of the lens unit 200, in a case where the lens unit 200 is configured to be attachable and detachable with respect to the camera main body 100.

The battery 102 is attachable and detachable with respect to the camera main body 100. When a power switch (not shown) included in the operation unit 108 is turned on in a state in which the battery 102 is mounted to the camera main body 100, power is supplied from the camera power supply circuit 103 to the camera microcomputer 101. Further, the power is supplied from the camera power supply circuit 103 to each unit that requires the power, by the control of the camera microcomputer 101.

The shutter 104 controls exposure time of the image pickup device 105 under the control of the camera microcomputer 101. The image pickup device 105 is a CMOS image sensor, for example, and photoelectrically converts an optical image of a subject that is formed through the lens unit 200, and outputs an analog signal to the AD converting block 106. The AD converting block 106 converts the analog signal acquired from the image pickup device 105 into a digital signal according to a set ISO sensitivity.

The image processing block 107 performs filter processing, color conversion processing or gamma/knee processing on image data converted into the digital signal by the AD converting block 106, at the time of photographing a still image. In addition, the image processing block 107 performs white balance processing to the image data input from the AD converting block 106, and outputs the processed image data to the display unit 110. Further, the image processing block 107 has a compression processing function of image data such as JPEG. Further, the image processing block 107 has a moving image generation function to generate a moving image from a plurality of still images based on a command of the camera microcomputer 101.

In a case where a continuous shooting mode is set on the camera main body 100, the image data is temporarily stored in a buffer memory (not shown), the unprocessed image data is read out from the buffer memory to the image processing block 107, and the image processing and the compression processing are performed by the image processing block 107. In addition, the image processing block 107 transmits moving image data to the display unit 110 to be displayed thereon while performing the image processing and the like at the time of preparing photographing of the moving image, and stores the moving image data into the external memory 109 at the time of storing the moving image.

The external memory 109 is, for example, a semiconductor memory card or the like which is attachable and detachable with respect to the camera main body 100. The camera microcomputer 101 confirms the storage capacity of the external memory 109 based on prediction data of the ISO sensitivity, the image size and an image size according to an image quality that are set prior to photographing, calculates the number of still images that can be photographed and a storable time of a moving image, and displays the results on the display unit 110.

The operation unit 108 includes a power button, a release button, a cross button, and the like, receives an operation of a user (user of the digital camera), and transmits the operation information to the camera microcomputer 101. Each photographing function is realized by the camera microcomputer 101 controlling each unit of the camera main body 100 and the lens unit 200 according to the operation information from the operation unit 108. For example, the camera microcomputer 101 performs a photographing preparation operation when the release button is half-pressed and performs a photographing operation when the release button is fully pressed. In addition, it is possible to perform various settings such as a photographing mode by operating the operation unit 108.

The display unit 110 is, for example, a liquid crystal panel, and displays an image according to a display command of the camera microcomputer 101. In addition, a touch panel, which is included in the operation unit 108, is disposed in the display unit 110, and it is configured such that the user can perform various settings of the camera main body 100 by touching a menu (icon) displayed on the display unit 110.

The lens microcomputer 201 controls the operation of each unit configuring the lens unit 200 under the control of the camera microcomputer 101. Incidentally, when power is supplied to the camera microcomputer 101, the power is also supplied to the lens microcomputer 201. The lens power supply circuit 203 receives the supply of power from the camera power supply circuit 103 of the camera main body 100, and supplies the power to each unit inside the lens unit 200 according to the control performed by the lens microcomputer 201.

The photographing lens 202 is configured of a plurality of lenses including a focus lens and a zoom lens. The lens driving circuit 206 includes, for example, a stepping motor, adjusts a focus by adjusting a position of the focus lens forming the photographing lens 202 according to a control signal from the lens microcomputer 201, and further, changes a photographing field angle by performing a zoom operation by driving the zoom lens. The diaphragm drive circuit 205 adjusts the diaphragm 204 according to the control signal from the lens microcomputer 201. Incidentally, the lens microcomputer 201 receives the control signal, which corresponds to a photometric value detected by a photometry unit (not shown), from the camera microcomputer 101, and transmits the control signal to the diaphragm drive circuit 205.

<First Embodiment>

In a moving image generation method according to a first embodiment using a digital camera, a time-lapse photographing function and an AF bracket photographing function, which is one of an automatic bracket photographing functions, are combined, and a plurality of time-lapse moving images are automatically generated for each photographing condition of the AF bracket photographing, in outline.

Incidentally, the time-lapse photographing function is a function to perform photographing for the number of frames set in advance with a time interval set in advance so as to acquire photographed images. In addition, the automatic bracket photographing function is a function to sequentially perform photographing under a plurality of photographing conditions set in advance for a single frame to acquire photographed images, and a plurality of photographed images are acquired by performing photographing by varying a focal length in the AF bracket photographing function. Each of the time-lapse photographing function and the automatic bracket photographing function is realized by the CPU that develops a predetermined program stored in the ROM to the RAM in the camera microcomputer 101, and the camera microcomputer 101 that controls the operation of each unit configuring the digital camera.

Figure 2:
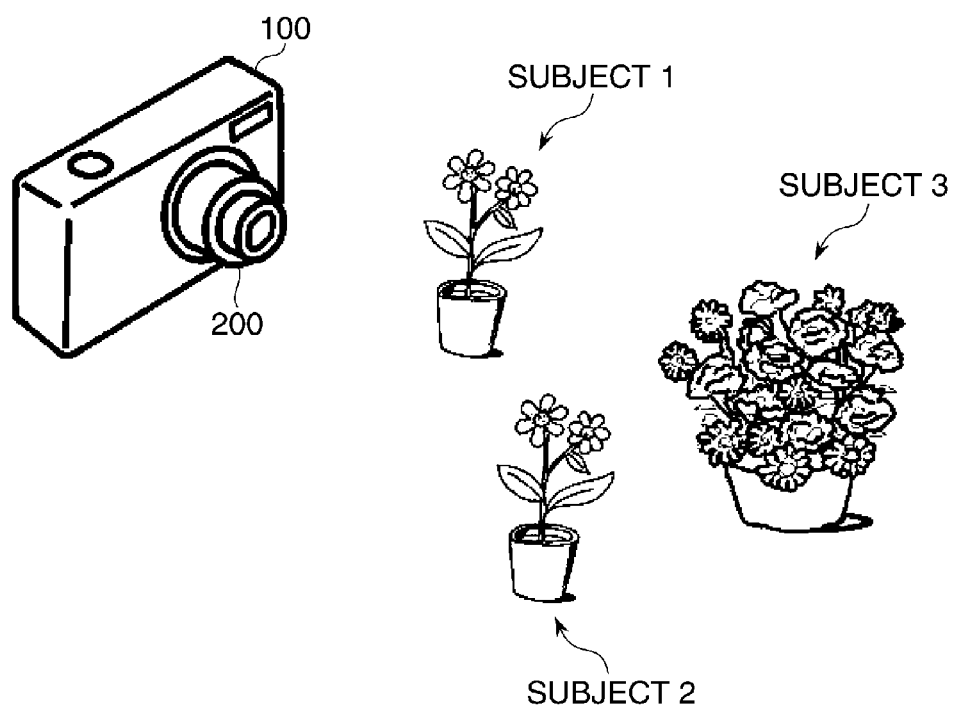
FIG. 2 is a diagram showing an example of a scene in which a plurality of time-lapse moving images are generated by combining a time-lapse photographing function and an AF bracket photographing function.

FIG. 2 is a diagram showing an example of a scene in which a plurality of time-lapse moving images are generated by combining the time-lapse photographing function and the AF bracket photographing function.

First, the user sets a condition of the AF bracket photographing by operating the operation unit 108 of the camera main body 100. For example, the user sets an AF bracket setting 1 by adjusting the focus on a subject A as a setting method according to an operation manual of the digital camera. Thereby, the camera microcomputer 101 acquires a position of the focus lens at the time of focusing on the subject A from the lens microcomputer 201, and stores the position, as the AF bracket setting 1, in the RAM in the camera microcomputer 101.

In the same manner, when the user sets an AF bracket setting 2 by adjusting the focus on a subject B, a position of the focus lens at the time of focusing on the subject B is stored, as the AF bracket setting 2, in the RAM in the camera microcomputer 101. Further, when the user sets an AF bracket setting 3 by adjusting the focus on a subject C, a position of the focus lens at the time of focusing on the subject C is stored, as the AF bracket setting 3, in the RAM in the camera microcomputer 101.

Incidentally, the same operation is repeated when there are more subjects, and a "bracket setting number M" is stored in the RAM in the camera microcomputer 101 in a case where the M number of AF bracket settings are performed in total. Thereby, the setting of the condition of the AF bracket photographing is finished.

Figure 3:
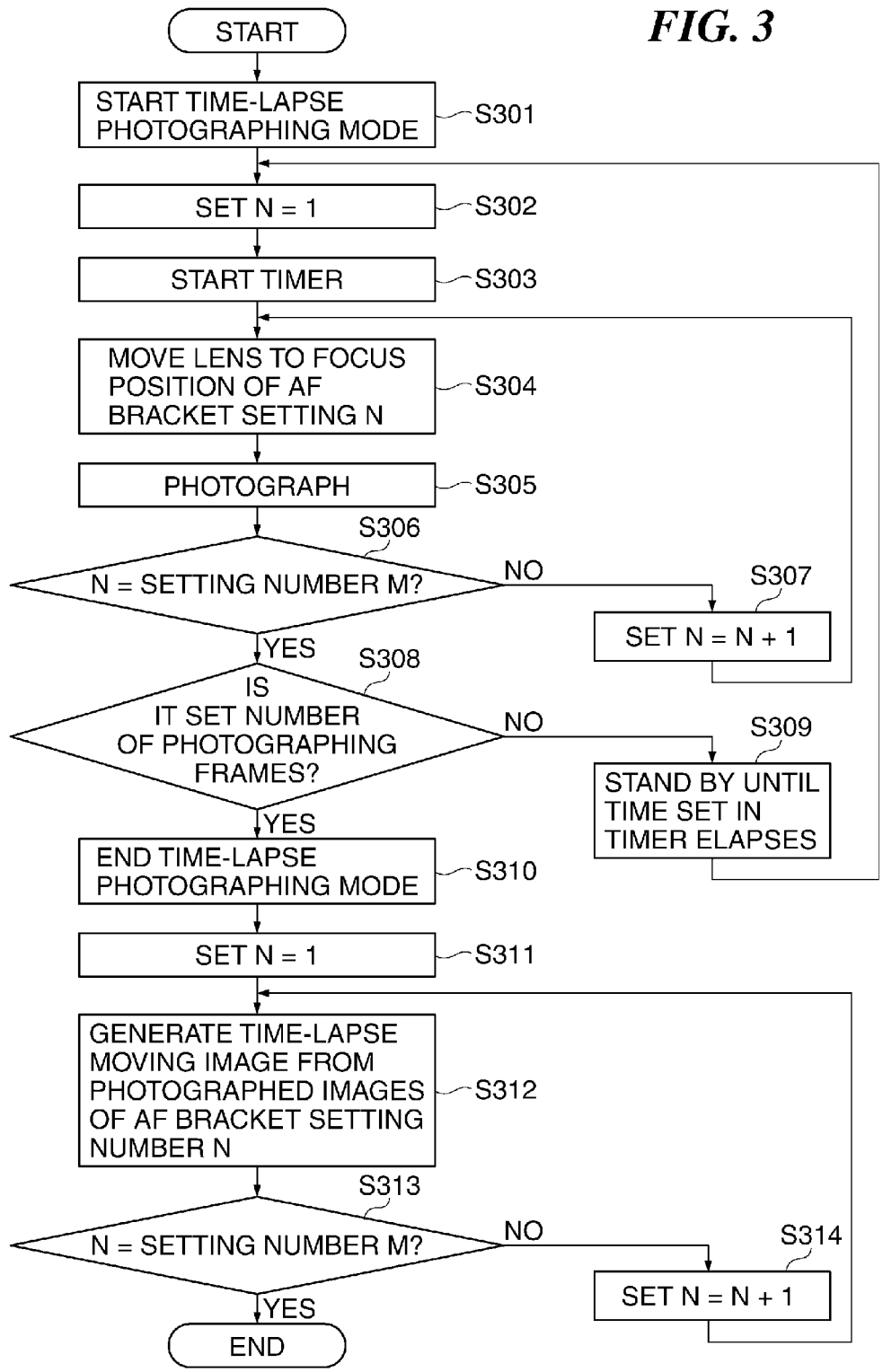
FIG. 3 is a flowchart of a process according to a first embodiment in which the plurality of time-lapse moving images are generated by combining the time-lapse photographing function and the AF bracket photographing function.

FIG. 3 is a flowchart of a process according to the first embodiment in which the plurality of time-lapse moving images are generated by combining the time-lapse photographing function and the AF bracket photographing function. Each process shown in the flowchart of FIG. 3 is realized by the camera microcomputer 101 executing a predetermined program to control the operation of each unit configuring the digital camera.

The user operates the operation unit 108 to complete a setting of a predetermined photographing interval and the number of photographing frames (first setting) in order to use the time-lapse photographing function, prior to the step S301. In addition, the user completes a setting of the photographing condition (the M number of AF bracket settings) (second setting) in the AF bracket photographing function, prior to the step S301.

In the step S301, the camera microcomputer 101 starts an operation in the time-lapse photographing mode when receiving a photographing command through the operation unit 108. Subsequently, in the step S302, the camera microcomputer 101 sets a setting number N to "1", as an initial value, on an internal program that indicates current setting of the camera main body 100.

In the step S303, the camera microcomputer 101 sets a time interval of the time-lapse photographing in a built-in timer, and starts the timer. Subsequently, the camera microcomputer 101 moves the focus lens to the focus lens position through the lens microcomputer 201 according to the AF bracket setting N read out from the RAM, in the step S304. Further, in the step S305, the camera microcomputer 101 performs photographing under a set light exposure condition, and stores the photographed image in the external memory 109.

Next, in the step S306, the camera microcomputer 101 determines whether the current setting number N reaches the bracket setting number M stored in the RAM. In a case where the setting number N does not reach the bracket setting number M (N<M, NO in the step S306), the camera microcomputer 101 causes the process to proceed to the step S307, and in a case where the setting number N reaches the bracket setting number M (N=M, YES in the step S306), the camera microcomputer 101 causes the process to proceed to the step S308. In the step S307, the camera microcomputer 101 increases the setting number N by one, and returns the process to the step S304.

In the example of FIG. 2, when the setting number N reaches three, the process proceeds from the step S306 to the step S308. Further, in the example of FIG. 2, when the determination in the step S306 is "YES", an image of one frame is photographed for each of the AF bracket settings 1, 2 and 3 in one frame, and the still images of three frames in total are photographed.

In the step S308, the camera microcomputer 101 determines whether the current number of photographing frames reaches the number of photographing frames set in advance. In a case where the current number of photographing frames does not reach the set number of photographing frames (NO in the step S308), the camera microcomputer 101 causes the process to proceed to the step S309, and in a case where the current number of photographing frames reaches the set number of photographing frames (YES in the step S308), the camera microcomputer 101 causes the process to proceed to the step S310.

In the step S309, the camera microcomputer 101 stands by until the time interval set in the step S303 (time until the next photographing in the time-lapse photographing function) elapses, and thereafter, returns the process to the step S302. In the example of FIG. 2, in a case where the number of frames set in advance is 100, for example, when the determination in the step S308 is "YES", images of 100 frames in each of the AF bracket settings 1, 2 and 3, that is, the images of 300 frames in total are photographed.

In the step S310, the camera microcomputer 101 ends the time-lapse photographing mode. Subsequently, in the step S311, the camera microcomputer 101 sets "1" to the setting number N on the internal program again. Further, in the step S312, the camera microcomputer 101 controls the image processing block 107 and generates a time-lapse moving image configured of photographed images for the setting number N as frames.

In the step S313, the camera microcomputer 101 determines whether or not the current setting number N reaches the bracket setting number M stored in the RAM. In a case where the setting number N does not reach the bracket setting number M (N<M, NO in the step S313), the camera microcomputer 101 causes the process to proceed to the step S314. Further, in the step S314, the camera microcomputer 101 increases the setting number N by one and returns the process to the step S312. Meanwhile, in a case where the setting number N reaches the bracket setting number M (N=M, YES in the step S313), the camera microcomputer 101 is in a state in which the M number of moving images are created, and terminates the present process.

When the time-lapse moving image is generated according to the flowchart of FIG. 3, the following effect is obtained. That is, if photographed images are composes in the photographed order to generate a time-lapse moving image, a moving image, which causes an uncomfortable feeling as the state of being focused and the state of being out of focus are changed with a constant time interval, regarding a specific subject, is generated even though the subject is not moving. On the contrary, through the steps S311 to S314, for example, when images of 100 frames are photographed in the AF bracket setting 1 in the example of FIG. 2, one time-lapse moving image is automatically generated using these images of 100 frames. In the same manner, one time-lapse moving image is automatically generated using images photographed in the AF bracket setting 2, and one time-lapse moving image is automatically generated using images photographed in the AF bracket setting 3. Accordingly, it is unnecessary for the user to perform work to extract frame images having the same focus position. In addition, it is possible to generate the time-lapse moving image under the respective focus conditions while avoiding the generation of the moving image which causes the uncomfortable feeling as the focus state with respect to the specific subject is changed with the constant time interval.

Incidentally, in the process according to the flowchart of FIG. 3, the photographed images (still images), which have been used for generation of the time-lapse moving image, is still stored in the external memory 109 after the time-lapse moving image is generated, and thus, it is desirable that the storage capacity of the external memory 109 be large. On the other hand, it may be configured such that the user can select whether or not image data of the still images that have been used for generation of the moving image is deleted, after the generation of the time-lapse moving image is completed.

This selection can be realized through a configuration, for example, by which a message for asking a user for permission on the still image deletion and an icon that enables the user to select permission or non-permission are displayed on the display unit 110. In this manner, when it is configured such that the user can easily perform the deletion of the image data of the still image, which makes it possible to use the external memory 109 having a small storage capacity.

In addition, in the process according to the flowchart of FIG. 3, the time-lapse moving image is generated after photographing all of the still images to be used for generation of the time-lapse moving image; however, the timing at which the time-lapse moving image is generated is not limited thereto. For example, it may be configured such that the time-lapse moving image is generated for each of the AF bracket settings every time the photographing in each of AF bracket settings is performed in the step S305.

That is, it may be configured such that a photographed image is converted into moving image data every time a still image is photographed, and a time-lapse moving image is generated by adding new data to the moving image data which has been generated. At this time, it may be configured such that the image data of the still image, which has been used for generation of the time-lapse moving image, is automatically deleted, and accordingly, it is possible to generate a desired time-lapse moving image even through the external memory 109 has a small capacity.

<Second Embodiment>

In the first embodiment, time required for photographing in one frame increases as the bracket setting number increases, and thus, there is a possibility that the photographing under all the bracket photographing conditions is not completed in a case where time set between frames in the time-lapse photographing function is short. Thus, in a second embodiment, a time interval between frames in the time-lapse photographing is set depending on the bracket setting number.

Figure 4:
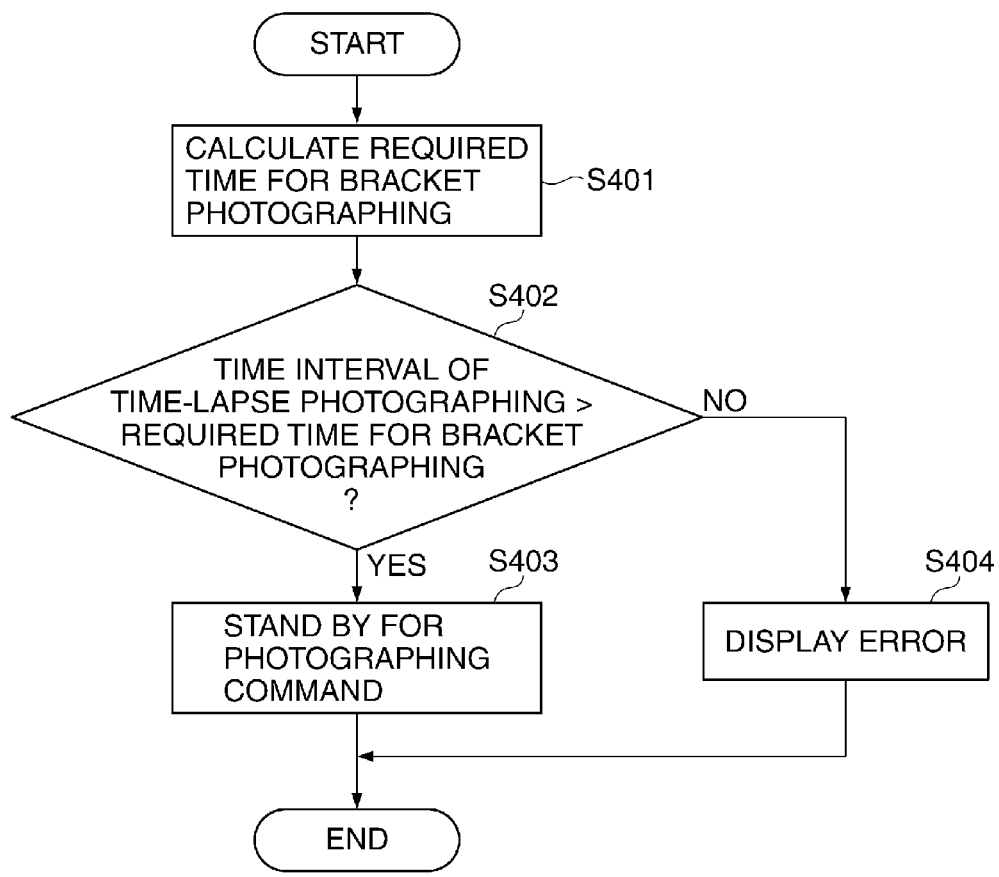
FIG. 4 is a flowchart of a process according to a second embodiment which is added to the process of the flowchart shown in FIG. 3.

FIG. 4 is a flowchart of a process according to the second embodiment which is added to the process of the flowchart illustrated in FIG. 3. Accordingly, the process of generating the plurality of time-lapse moving images by combining the time-lapse photographing function and the AF bracket photographing function, which has been described with reference to FIGS. 2 and 3, is performed subsequently to the process of the flowchart of FIG. 4, herein. Incidentally, each process shown in the flowchart of FIG. 4 is realized by the camera microcomputer 101 executing a predetermined program.

When the user performs the AF bracket setting and sets a predetermined photographing interval and the number of photographing frames on the time-lapse photographing function, similarly to the first embodiment, the camera microcomputer 101 performs photographing preparation according to the flowchart of FIG. 4. In the step S401, the camera microcomputer 101 calculates time required for photographing under all the AF bracket settings in one frame (required time for the bracket photographing) based on the bracket setting number. The required time for the bracket photographing in the step S401 is obtained, for example, as follows: "(time required for photographing of one piece+a predetermined drive time of the focus lens)×the bracket setting number".

Subsequently, in the step S402, the camera microcomputer 101 compares the time interval between frames set in the time-lapse photographing function (time interval of the time-lapse photographing) and the required time for the bracket photographing obtained in the step S401. The camera microcomputer 101 causes the process to proceed to the step S403 in a case where the time interval of the time-lapse photographing is longer than the required time for the bracket photographing (YES in the step S402). On the other hand, the camera microcomputer 101 causes the process to proceed to the step S404 in a case where the time interval of the time-lapse photographing is not longer than the required time for the bracket photographing (NO in the step S402).

In the step S403, the camera microcomputer 101 sets the camera main body 100 to be in the stand by state for a photographing command, and accordingly, the present process is terminated, and the process is turned into the stand by state for a photographing command in the step S301 of FIG. 3. Meanwhile, in the step S404, the camera microcomputer 101 performs error processing such as performing error indication on the display unit 110, and accordingly, the present process is terminated.

Incidentally, it may be configured such that the time interval of the time-lapse photographing is automatically set to be longer than the required time for the bracket photographing by the user the operating unit 108 when the error indication is performed in the step S404. In such a case, it may be further configured such that a change of the time interval of the time-lapse photographing is indicated on the display unit 110. On the contrary, the bracket setting number may be restricted depending on the set time interval of the time-lapse photographing.

As described above, according to the second embodiment, it is possible to prevent the start of photographing in an inappropriate setting when the photographing is performed by combining the time-lapse photographing function and the automatic bracket photographing function, which make it possible to reliably generate the time-lapse moving image under the set condition.

<Third Embodiment>

A third embodiment is configured such that photographed images are dividedly stored in the external memory 109 for each of the plurality of AF bracket settings that have been described in the first embodiment and the second embodiment.

Figure 5:
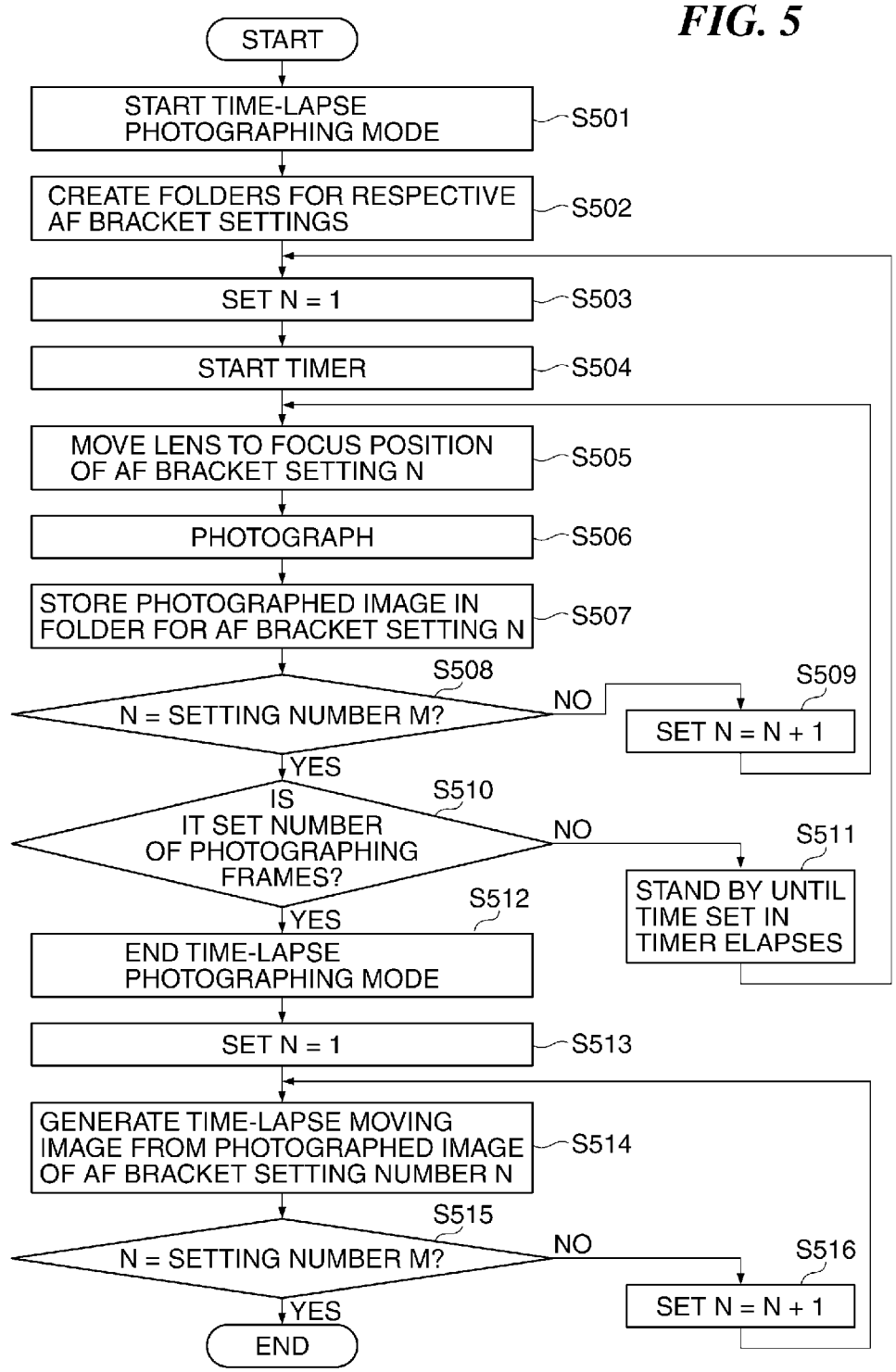
FIG. 5 is a flowchart of a process according to a third embodiment in which the plurality of time-lapse moving images are generated by combining the time-lapse photographing function and the AF bracket photographing function.

FIG. 5 is a flowchart of a process according to the third embodiment in which the plurality of time-lapse moving images are generated by combining the time-lapse photographing function and the AF bracket photographing function. Each process shown in the flowchart of FIG. 5 is realized by the camera microcomputer 101 executing a predetermined program to control the operation of each unit configuring the digital camera.

A process in the step S501 is the same as the process in the step S301 of FIG. 3, and thus, the description thereof is omitted. Subsequently, in the step S502, the camera microcomputer 101 creates folders, which are configured to store photographed images for each of the plurality of set AF bracket settings, in the external memory 109. Subsequent processes in the steps S503 to S506 are the same as the processes in the steps S302 to S305, and thus, the description thereof is omitted.

Next, in the step S507, the camera microcomputer 101 stores the photographed image acquired in the step S506 into the folder corresponding to the AF bracket setting N. The subsequent processes in the steps S508 to S516 are the same as the processes in the steps S306 to S314, and thus, the description thereof will be omitted.

In the step S312 of the first embodiment, it is necessary to generate the time-lapse moving image by extracting the photographed image for each of the AF bracket settings from the photographed images stored in the external memory 109. On the contrary, the camera microcomputer 101 may generate the time-lapse moving image for each of the AF bracket settings directly using the photographed image in the folder set for each of the AF bracket settings in the step S514. Accordingly, it is possible to shorten the time required for generation of the time-lapse moving image. In addition, since the photographed image is stored for each of the folders provided for each of the AF bracket settings, it is possible to improve the user's convenience for retrieval or readout of the image.

<Fourth Embodiment>

In the moving image generation method according to the first embodiment, the plurality of photographed image are acquired by performing photographing for each of the photographing conditions set using the AF bracket photographing function, and the time-lapse moving image is generated for each of the photographing conditions. On the contrary, in a fourth embodiment, first, a plurality of images are photographed using the time-lapse photographing function in the state of focusing on a predetermined subject without using the AF bracket photographing function. Further, a plurality of different image processing conditions set by the user are applied for each of the plurality of acquired photographed images, and accordingly, a plurality of processed images are generated using the single photographed image, and a time-lapse moving image is generated for each of the plurality of different image processing conditions using the plurality of generated processed images.

Figure 6:
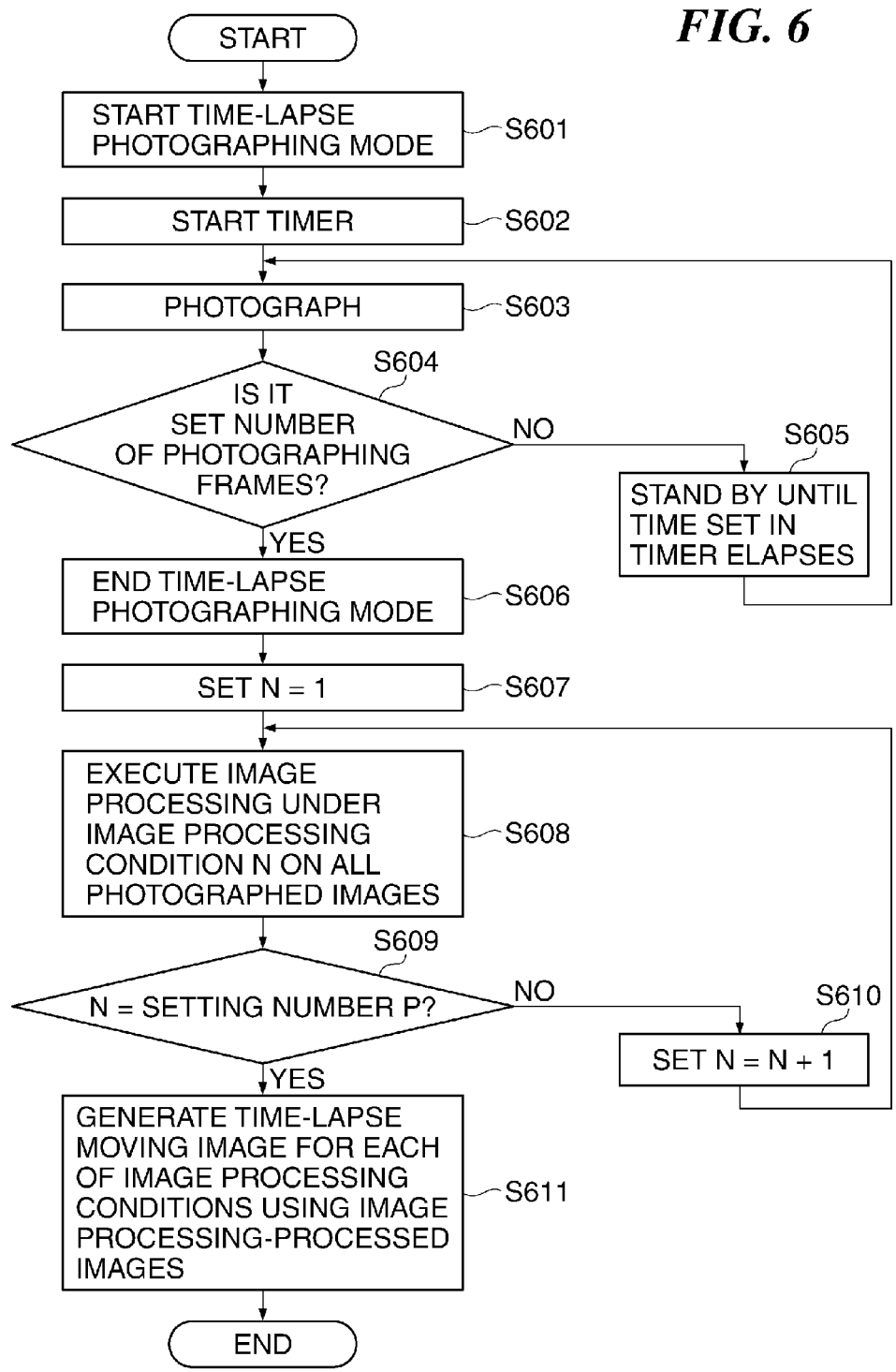
FIG. 6 is a flowchart of a process according to a fourth embodiment in which the plurality of time-lapse moving images are generated by using the time-lapse photographing function.

FIG. 6 is a flowchart of a process according to the fourth embodiment in which the plurality of time-lapse moving images are generated by using the time-lapse photographing function. Each process shown in the flowchart of FIG. 6 is realized by the camera microcomputer 101 executing a predetermined program to control the operation of each unit configuring the digital camera.

It is assumed that the user sets a predetermined subject to be focused on, and further, complete settings of the plurality of different image processing conditions to be executed on the photographed image prior to starting the step S601. Herein, image processing conditions of P types are set, and a "processing condition setting number P" is stored in the RAM in the camera microcomputer 101.

Processes in the steps S601, S602, S603, S604, S605 and S606 are the same as the processes in the steps S301, S303, S305, S308, S309 and S310 of FIG. 3, and thus, the description thereof will be omitted. Incidentally, in the step S603, photographing may be performed under a fixed exposure condition which is set in advance, or photographing may be performed under an exposure condition determined using an AE function for each photographing.

The camera microcomputer 101 sets the setting number N to "1", as an initial value, on the internal program in the step S607 after completion of the time-lapse photographing mode. Subsequently, in the step S608, the camera microcomputer 101 controls the image processing block 107 to execute image processing under the image processing condition N on all of the photographed images.

In the step S609, the camera microcomputer 101 determines whether the current setting number N reaches the processing condition setting number P stored in the RAM. The camera microcomputer 101 causes the process to proceed to the step S610 in a case where the setting number N does not reach the processing condition setting number P (N<P, NO in the step S609). In the step S610, the camera microcomputer 101 increases the setting number N by one, and returns the process to the step S608. On the other hand, the camera microcomputer 101 causes the process to proceed to the step S611 in a case where the setting number N reaches the processing condition setting number P (N=P, YES in the step S609). Incidentally, the processed image (the image processed under the set image processing condition) is generated for "the number of photographing frames×the processing condition setting number P" at a point in time when the determination in the step S609 is YES.

In the step S611, the camera microcomputer 101 generates a time-lapse moving image for each of the image processing conditions using the processed images. Accordingly, according to the fourth embodiment, the present process is completed, and the time-lapse moving image is generated for the processing condition setting number P. Incidentally, the photographed image acquired in the step S603 may be deleted from the external memory 109 along with the completion of the image processing of the step S608, or may be directly stored in the external memory 109. In addition, the image (processed image) has been subjected to the image processing in the step S608 may also be deleted from the external memory 109 along with the completion of the process of generating the time-lapse moving image of the step S611, or may be directly stored in the external memory 109. Further, it may be configured such that the user can select, after generation of the time-lapse moving image, whether or not to delete the image data of the still images have been used for generation of the moving image (the photographed image acquired in the step S603 and the image has been subjected to the image processing in the step S608).

In the above-described process according to the flowchart of FIG. 6, the different image processing conditions to be executed on the photographed image are set prior to the step S601, but the timing when the plurality of different image processing conditions are set is not limited thereto, and for example, may be configured such that the plurality of different image processing conditions are set after the completion of the step S606. In addition, it may be configured such that a process of setting a single image processing condition and generating a single time-lapse moving image is repeated for the number of types of image processing that the user desires, after the completion of the step S606.

In the process according to the flowchart of FIG. 6, the time-lapse moving image is generated after the completion of the entire photographing and the completion of the image processing on the photographed image by applying all the plurality of different image processing conditions. However, the invention is not limited thereto, and may be configured such that a time-lapse moving image is generated by performing the image processing by applying the plurality of different image processing conditions that have been set to the photographed image, every time photographing is performed in the step S603. In this case, it may be configured such that the time-lapse moving image is generated by converting the generated processed image into moving image data every time the image processing is performed, and adding the converted data to moving image data that has been already generated. At this time, it may be configured such that the image data of the photographed image acquired in the step S603 and the processed image generated in the step S608, which have been used for generation of the moving image data, is automatically deleted. Accordingly, it is possible to generate a desired time-lapse moving image even through the external memory 109 has a small capacity.

In addition, in the process according to the flowchart of FIG. 6, it is configured such that the process of applying the single image processing condition to all of the photographed images is repeated for the number of times corresponding to the number of settings of the image processing condition (steps S607 to S610). The invention is not limited thereto, and may be configured such that a process of generating a plurality of processed images by applying a plurality of different image processing conditions to a photographed image of a single frame is repeated for the number of frames of the photographed images. It is possible to combine the fourth embodiment and the first embodiment. That is, a plurality of different image processing conditions are set while performing the AF bracket setting using the AF bracket photographing function. When the setting number of the AF bracket settings is M, and the setting number of the plurality of different image processing conditions is P, the P number of time-lapse moving images are generated for each of the AF bracket settings, and the "M×P" number of time-lapse moving images are generated in total.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the above-described embodiment, the focus lens position is stored for each of a plurality of subjects, and the AF bracket photographing, in which the photographed images are acquired by sequentially performing photographing at a plurality of the stored focus lens positions, is combined with the time-lapse photographing function. However, the invention is not limited thereto, and another function may be combined with the time-lapse photographing function. For example, the time-lapse photographing function may be combined with a zoom bracket photographing function, by which a photographed image is acquired at a plurality of zoom positions by driving a zooming lens, to generate a time-lapse moving image for each photographing field angle. In the same manner, it is also possible to combine a bracket photographing in which a plurality of conditions are set using various parameters, such as diaphragm values, exposure values, white balance adjustment values, color tones (color, monochrome, sepia and the like), shutter speed and ISO sensitivities, with the time-lapse photographing function.

In addition, the image pickup apparatus according to the invention is not limited to the digital camera, and may be various types of electronic devices provided with a camera function (photographing function to acquire a video using an image pickup device). For example, the image pickup apparatus according to the invention may be a camera function-equipped portable communication terminal (a mobile phone, a smartphone, or the like), a camera function-equipped portable computer (tablet terminal), a camera function-equipped portable game machine, and the like. Further, the image pickup apparatus that photographs the still image and the image processing apparatus that generates the time-lapse moving image may be configured to enable wired or wireless communication, instead of being configured to be integrated like the digital camera.

This application claims the benefit of Japanese Patent Application No. 2015-162687, filed Aug. 20, 2015 which is hereby incorporated by reference wherein in its entirety.

What is claimed is:

1. An image pickup apparatus comprising:
   image pickup device configured to form an optical image of a subject to acquire a photographed image;
   a processor connected to a memory, the processor and memory configured to:
   perform photographing using said image pickup device at a time interval set in advance; and
   control so as to store a plurality of photographed images acquired by the photographing performed at the time interval, into a storage device,
   wherein the processor and memory are further configured to perform, for each time interval, a set of plurality of photographing each of which is performed according to each of a plurality of photographing conditions set in advance, to thereby acquire a plurality of photographed images corresponding to each of the plurality of photographing conditions, and store the acquired plurality of photographed images into the storage device, wherein the set of plurality of photographing performed at the time interval and the storage of the acquired plurality of photographed images are repeatedly performed.

2. The image pickup apparatus according to claim 1, wherein said control unit compares the time interval and a required time which is required for photographing under the plurality of photographing conditions, and performs error processing when the time interval is shorter than the required time.

3. The image pickup apparatus according to claim 1, wherein said control unit compares the time interval and a required time which is required for photographing under the plurality of photographing conditions, and changes the time interval to another time interval longer than the required time when the time interval is shorter than the required time.

4. The image pickup apparatus according to claim 1, where control unit restricts a setting number of the plurality of photographing conditions, according to the time interval.

5. The image pickup apparatus according to claim 1, wherein the processor and memory are further configured to create folders in the storage device for each of the plurality of photographing conditions, and sequentially stores the plurality of photographed images, which are photographed according to the plurality of photographing conditions into the corresponding folders.

6. The image pickup apparatus according to claim 1, wherein said control unit performs the generation of the moving image using said moving image generation unit, after all photographing of still images to be used for the generation of the moving image using said moving image generation unit are finished.

7. The image pickup apparatus according to claim 1, wherein said control unit performs the generation of the moving image using said moving image generation unit, every time when photographing of a single frame using said time-lapse photographing unit is finished.

8. The image pickup apparatus according to claim 1, further comprising a display unit,
   wherein said control unit controls the display unit to display an indication, which causes a user to select whether or not to delete the photographed image which has been used for the generation of the moving image using said moving image generation unit.

9. The image pickup apparatus according to claim 1, wherein the plurality of photographing conditions are at least one of a plurality of focus positions, a plurality of diaphragm values, a plurality of exposure values, a plurality of white balance adjustment values, a plurality of color tones, a plurality of shutter speeds, and a plurality of ISO sensitivities.

10. A moving image generation method of generating a moving image from photographed images, which are acquired by forming an optical image of a subject on an image pickup device, the moving image generation method comprising:
    performing photographing using said image pickup device at a time interval set in advance;
    storing a plurality of photographed images acquired by the photographing performed at the time interval, into a storage device; and
    performing, for each time interval, a set of plurality of photographing each of which is performed according to each of a plurality of photographing conditions set in advance, to thereby acquire a plurality of photographed images corresponding to each of the plurality of photographing conditions, and storing the acquired plurality of photographed images into the storage device, wherein the set of plurality of photographing performed at the time interval and the storage of the acquired plurality of photographed images are repeatedly performed.

11. A non-transitory computer-readable storage medium storing a program for causing a computer to execute a moving image generation method of generating a moving image from photographed images, which are acquired by forming an optical image of a subject on an image pickup device, the moving image generation method comprising:
    performing photographing using said image pickup device at a time interval set in advance;
    storing a plurality of photographed images acquired by the photographing performed at the time interval, to a storage device, and
    performing, for each time interval, a set of plurality of photographing each of which is performed according to each of a plurality of photographing conditions set in advance, to thereby acquire a plurality of photographed images corresponding to each of the plurality of photographing conditions, and storing the acquired plurality of photographed images into the storage device, wherein the set of plurality of photographing performed at the time interval and the storage of the acquired plurality of photographed images are repeatedly performed.

12. The image pickup apparatus according to claim 1, wherein the processor and memory are further configured to control so as to store a moving image generated from the plurality of the photographed images, which are photographed at the time interval, into the storage device.

13. The image pickup apparatus according to claim 12, wherein the processor and memory are further configured to control so as to generate different moving images for each of the plurality of photographing conditions, and store the generated different moving images into the storage device.

14. The image pickup apparatus according to claim 1, wherein the processor and memory are further configured to:
control, so as to generate different moving images from the plurality of photographed images, which are photographed at the time interval under the plurality of photographing conditions, for each of the photographing conditions, and store the generated different moving images into the storage device.

* * * * *